Nov. 21, 1967  H. SCHLAMP ET AL  3,353,257

GAS BURNING APPARATUS

Filed Sept. 17, 1965  2 Sheets-Sheet 1

INVENTORS
HERMANN SCHLAMP
PETER WEBER
BY
*Pennie, Edmonds, Morton, Taylor & Adams*
ATTORNEYS

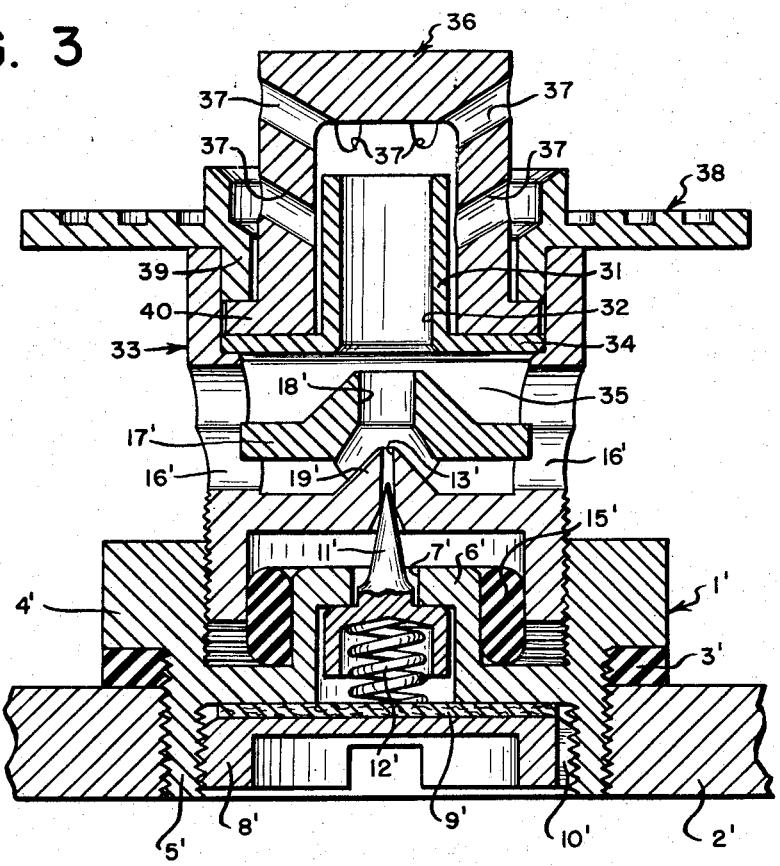

the vaporized fuel and air.

A preferred embodiment of the invention is described as follows with reference to the accompanying drawings wherein:

FIG. 3 is a sectional elevation of another particular embodiment of a part of the invention.

Figure 1:
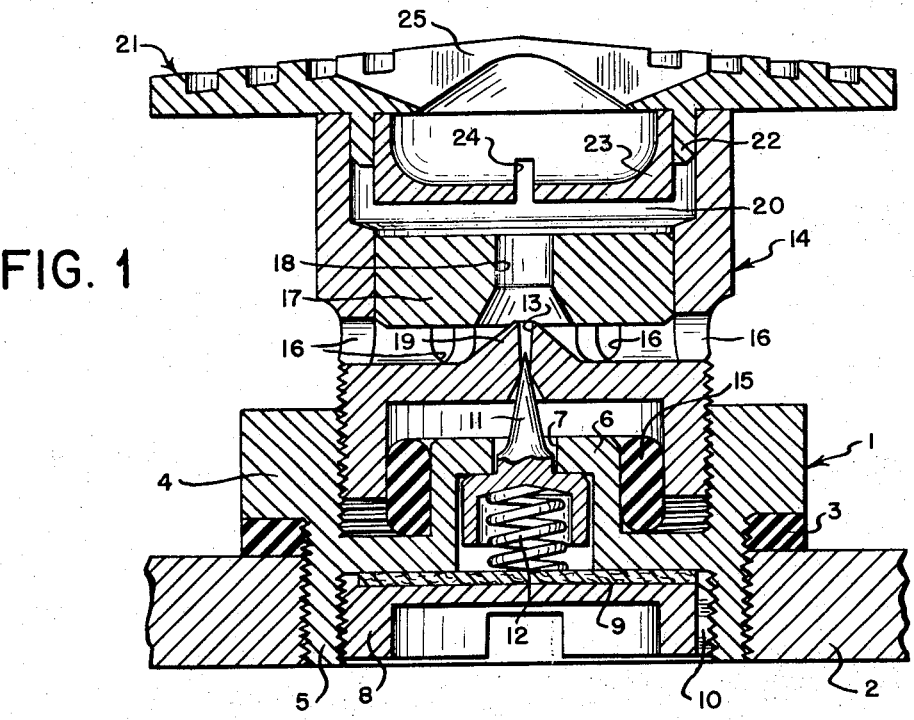
FIG. 1 is a sectional elevation of a particular embodiment of the invention.

FIG. 1 shows an annular valve body 1 having a portion 5 threaded internally and externally, the external threads being in engagement with a threaded portion of a wall of a fuel supply tank 2. An annular sealing element 3 is disposed about the valve body 1 and is held in sealing engagement with the wall of the fuel supply tank 2 by an annular flange 4 formed about the valve body 1. The valve body 1 also contains an inwardly extending annular flange 6, the innermost periphery of which forms a circular bore 7. A disc-like porous gasket 9 is pressed against a portion of the inwardly extending annular flange 6 by an insert 8 which is externally threaded to engage with the internal threads on the threaded portion 5 of the valve body 1. The insert 8 has a longitudinal gap 10 in its threads which provides a continuous open path from the fuel supply tank 2 to the porous gasket 9. A tapered needle 11, with its narrowest portion remote from the valve body 1, is held in position in relation to the valve body 1 by an innermost portion of the flange 6, and a helical spring 12 disposed between the base of the tapered needle and the disc-like porous gasket 9. The circular bore 7 formed by the innermost periphery of the flange 6 is larger than the tapered needle 11 that partially projects from it so that an open path is formed for the flow of vaporized fuel from the porous gasket 9 past the tapered needle 11. A cylindrical mixing chamber body 14, externally threaded at its base to engage with internal threads disposed on the valve body 1, is mounted thereon, and an annular sealing element 15 is disposed between the inside periphery of the mixing chamber body 14 and a portion of the inwardly projecting flange 6. The cylindrical mixing chamber body 14 contains concentrically within it an orifice 13 formed by the inside periphery of a flange 19 extending inwardly from the mixing chamber body. The orifice 13 is of cylindrical configuration at its portion most remote from the valve body 1, and is of conical configuration at its portion most adjacent the valve body 1 with its taper being in the same direction as that of the tapered needle 11, but with the apex angle of its taper being somewhat greater than the apex angle of the needle 11. The surface of the inwardly extending flange 19 adjacent the cylindrical portion of the orifice 13 is also of conical configuration, with its taper running in the same direction as that of the tapered needle 11. The tapered needle 11 partially projects into the orifice 13. A plurality of apertures 16 are regularly spaced about the mixing chamber body 14 to allow air into the mixing chamber body 14 to mix with vaporized fuel flowing through the orifice 13. An annular insert 17 is placed within the mixing chamber body 14, the annular insert 17 containing a bore 18 aligned with the orifice 13. That portion of the bore 18 most remote from the valve body 1 is of cylindrical configuration, and that portion of the bore 18 most adjacent the valve body 1 is of conical configuration, with its taper running in the same direction as the taper of the needle 11. A fan-shaped burner 21 having a number of concentric grooves formed in its face to promote heat dissipation is press-fitted into the mixing chamber body 14 and held by means of an annular flange projecting from the burner 21, the outer surface of the flange 22 pressing against the inside wall of the mixing 3,353,257
GAS BURNING APPARATUS
Hermann Schlamp, Cologne, and Peter Weber, Cologne-Dellbruck, Germany, assignors to Ronson Corporation, Woodbridge, N.J., a corporation of New Jersey
Filed Sept. 17, 1965, Ser. No. 488,182
Claims priority, application Germany, Sept. 24, 1964, R 38,843
10 Claims. (Cl. 239—417.3)

ABSTRACT OF THE DISCLOSURE

A gas burning apparatus having a valve body for connection to a gas supply tank, a metering needle connected to the valve body, a mixing chamber body connected to the valve body and having an internal orifice into which the needle projects, the mixing chamber body being mounted on the valve body for axial movement with respect to the metering needle to adjust its position within the orifice, an opening in the mixing chamber body for receiving air, and a burner mounted on the mixing chamber body for receiving gas and air from the mixing chamber body.

---

Gas burners which contain means for introducing air into a stream of vaporized fuel and mixing the fuel and air for proper combustion are well known. Generally, the vaporized fuel flows through a valve and draws with it air entering the stream through apertures properly disposed in the valve body, the vapoized fuel and air then flowing together through a mixing chamber until they are properly commingled.

It is often desirable to construct the gas burning apparatus in as compact and stable a manner as possible, as for example, when the apparatus is to be portable. Compactness in a portable unit is obviously important, as is the ability to remain in the desired state of adjustment when the apparatus is moved or handled in any other way. It has been found that a valve made up of a needle partially projecting into an orifice is particularly well suited for use in such small portable units, but problems of compactness and adjustment sensitivity have continued to exist. Since complete mixing of the air and vaporized fuel is essential, it has been the practice to use with this type of valve a relatively long mixing chamber, resulting in a unit which is more cumbersome than is desired. Furthermore, we have found that the known means for adjusting the extent of projection of the needle into the orifice, such as a small thumbscrew projecting from the valve body is quite unstable. This adjustment instability often results in an undesired change in the degree of projection of the needle into the orifice when the apparatus is moved, unless an extreme degree of care is used.

It is the purpose of this invention to provide a new gas burning apparatus which is free from the above disadvantages in that it is quite compact and is able to remain in a proper state of adjustment while being handled in a normal manner, meanwhile insuring a proper mixing of the vaporized fuel and air.

Broadly stated, the gas burning apparatus contains a valve body and a mixing chamber body mounted upon it. A flange portion extends inwardly from one of the valve body or mixing chamber body and forms an orifice therein. A tapered needle is held by the other of the valve body and mixing chamber body with the tapered needle projecting into the orifice. Means are provided for moving the mixing chamber body relative to the valve body to alter the extent of projection of the needle into the orifice. Means are provided for admitting air to mix with vaporized fuel passing through the orifice, and a burner is chamber body 14, and the inner surface of the flange holding by means of another press-fit a cup-shaped element 23. The cup-shaped element 23 is held apart from the annular insert 17 by the annular flange to create a mixing chamber 20 the diameter of which is as large as the inside diameter of the complete mixing chamber body 14. The cup-shaped element 20 has as an opening a slot 24 which is at right angles to a slot 25 which is the opening in the fan-shaped burner 21.

In the operation of the apparatus, the fuel flows either in gaseous or liquid form along the path 10 formed in the thread of the threaded insert 8 to the porous gasket 9. Liquid fuel vaporizes from the gasket 9 while gaseous fuel issues through the gasket 9 directly. The vaporized fuel then flows through the bore 7 past the base of the tapered needle 11 and into and through the orifice 13. Since the mixing chamber body 14 containing within it the orifice 13 is rotatably threaded to the valve body 1, and the tapered needle 11 is held in position relative to the valve body 1, the extent of penetration of the tapered needle 11 into the orifice 13, and thereby the effective orifice, can be changed by rotating the mixing chamber body 14 relative to the valve body 1, moving the mixing chamber body 14 (and thus the orifice 13) axially relative to the base 1. From the orifice 13, the vaporized fuel flows into the bore 18 in the annular element 17, the rate of flow being sufficient to draw in air through the apertures 16. The mixture of air and vaporized fuel flows through the bore 18 and into the mixing chamber 20 where further mixing takes place. This mixture then flows through the slot 24 in the cup-shaped element 23 wherein even further mixing takes place and finally, the mixture issues from the slot 25 in the burner 21, where it is consumed.

Figure 2:
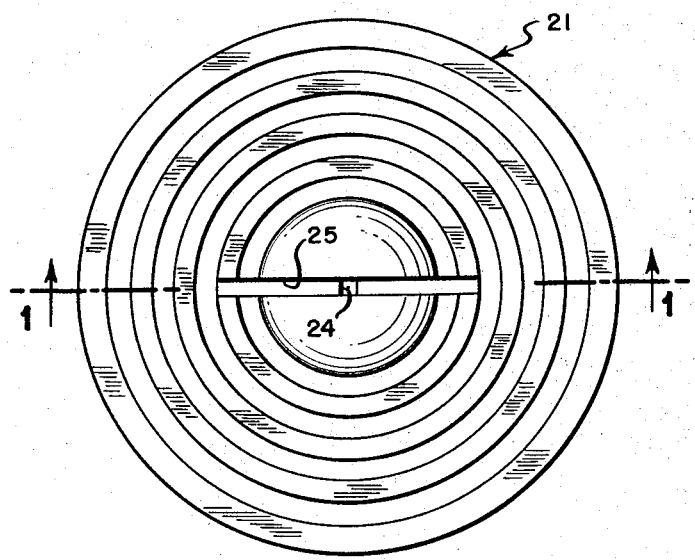
FIG. 2 is a plan view of that same particular embodiment of the invention.

FIG. 2 shows more clearly the configuration of the fan-shaped burner 21 with concentric grooves formed in its face and with the slot 25 which is the opening in its face.

In FIG. 3, those elements designated by primed reference numerals are structurally and functionally similar to their counterparts in FIG. 1, and thus they need not be described again. An annular channelling element 31 forming a channel 32 is placed within the mixing chamber body. A flanged portion 34 of the channelling element 31 rests on a radially disposed face formed within the mixing chamber body 33, the channelling element 31 being held apart from the annular insert 17' by the radially disposed face to create a mixing chamber 35. The diameter of the mixing chamber 35 is as large as the inside diameter of the complete mixing chamber body 33. Resting on the flange portion 34 of the channelling element 31 is a ceramic burner head 36 which contains a plurality of regularly spaced apertures 37. A fan-shaped heat dissipater 38 having a number of concentric grooves formed in its face to promote heat dissipation is press-fitting into the mixing chamber body 33 and held by means of an annular flange 39 projecting from the heat dissipator 38, the outer surface of the flange 39 pressing against the inside wall of the mixing chamber body 33. The face of the flange 39 presses against an annular flange 40 formed about the burner head 36, thereby holding the burner head 36 and annular channelling element 31 in place.

In this embodiment of the invention, as in that shown in FIG. 1, the mixing chamber body 33 containing within it the orifice 13' is rotatably threaded to the valve body 1', and the tapered needle 11' is held in position relative to the valve body 1'. The extent of penetration of the tapered needle 11' into the orifice 13', and thereby the effective orifice, can be changed by rotating the mixing chamber body 33 relative to the valve body 1' moving the mixing chamber body 33 (and thus the orifice 13') axially relative to the base 1'. From the orifice 13', the vaporized fuel flows into the bore 18' in the annular insert 17', the rate of flow being sufficient to draw in air through the apertures 16'. The mixture of air and vaporized fuel flows through the bore 18' and into the mixing chamber 35 where further mixing takes place. This mixture then flows through the channel 32 in the channelling element 31 wherein even further mixing takes place, and finally the mixture issues from the apertures 37 in the burner head 36, where it is consumed.

In both embodiments shown, the rate of flow of the gas through the orifice can thus be readily changed by turning the mixing chamber body relative to the valve body, since this changes the effective orifice as explained above. Thus, the need for any outside-extending valve adjustment is dispensed with. Furthermore, by constructing the apparatus as above, a high degree of compactness along with proper mixing of air and vaporized fuel is achieved.

We claim:
1. A gas burning apparatus comprising:
   (a) a valve body threaded into a wall of supply tank, said valve body
      (i) being internally threaded adjacent the supply tank to receive an externally threaded inset which holds a disc-like porous gasket within the valve body, said inset having a longitudinal gap in its threads to form an open path from the supply tank to the porous gasket,
      (ii) having an external annular flange which bears in sealing engagement upon an annular sealing element disposed between the external annular flange and the wall of the supply tank, and
      (iii) having an internal annular flange, a portion of which bears upon the outer edge of the porous gasket,
   (b) a cylindrical mixing chamber body mounted upon the valve body and containing an inwardly extending flange portion forming an orifice which is within and concentric with said mixing chamber body;
   (c) a tapered needle partially projecting into the orifice and held between
      (i) a further portion of the internal annular flange, said needle projecting partially beyond said internal annular flange with its narrowest portion remote from that flange, and
      (ii) a spring disposed between it and the porous gasket;
   (d) screw threads disposed on the mixing chamber body to engage with corresponding screw threads disposed on the valve body, the mixing chamber body thereby moving axially relative to the valve body when the chamber is rotated relative to the valve body, thus altering the extent of penetration of the needle into the orifice;
   (e) at least one aperture disposed in the mixing chamber body through which air is admitted to mix with vaporized fuel passing through the orifice; and
   (f) a burner mounted adjacent the mixing chamber body to receive and burn the mixture of vaporized fuel and air.

2. A gas burning apparatus according to claim 1 wherein an annular gasket is disposed between a portion of the inwardly extending flange formed in the valve body and a portion of the inside periphery of the mixing chamber body adjacent the base in sealing engagement therewith.

3. A gas burning apparatus according to claim 2 wherein an annular insert is placed within the mixing chamber body so that vaporized fuel issuing from the orifice and air entering the chamber through the aperture together flow through an axial bore in the annular insert.

4. A gas burning apparatus comprising:
   (a) a valve body threaded into a wall of a supply tank, said valve body
      (i) being internally threaded adjacent the supply tank to receive an externally threaded insert which holds a disc-like porous gasket within the base, said externally threaded insert having a longitudinal gap in its threads to form an open path from the supply tank to the porous gasket,
(ii) having an external annular flange which bears in sealing engagement upon an annular sealing element disposed between the flange and the wall of the supply tank, and
(iii) having an internal annular flange a portion of which bears upon the outer edge of the porous gasket,
(b) a cylindrical mixing chamber body mounted upon the valve body and containing an inwardly extending flange portion forming an orifice within and concentric with said mixing chamber body;
(c) a tapered needle partially projecting into the orifice and held between
(i) a further portion of the internal annular flange, said needle projecting partially beyond said internal annular flange with its narrowest portion remote from that flange, and
(ii) a spring disposed between it and the porous gasket;
(d) screw threads disposed on the mixing chamber body to engage with corresponding screw threads disposed on the valve body, the mixing chamber body thereby moving axially relative to the valve body, thus altering the extend of penetration of the needle into the orifice;
(e) a plurality of apertures regularly spaced about the mixing chamber body through which air is admitted to mix with vaporized fuel passing through the orifice;
(f) an annular insert placed within the mixing chamber body so that vaporized fuel issuing from the orifice and air entering the chamber through the apertures together flow through an axial bore in the annular insert;
(g) a fan-shaped slotted burner having a projecting annular flange, the outside periphery of which is press-fitted into the mixing chamber body and the inside periphery of which holds a cup-shaped element containing a slot at right angles to the slot in the burner, through which cup-shaped element the mixture of vaporized fuel and air flows from the axial bore in the annular insert to the slot in the burner.

5. A gas burning apparatus according to claim 4 wherein the screw threads are disposed about the cylindrical mixing chamber body and the corresponding screw threads with which they engage are disposed within the valve body.

6. A gas burning apparatus comprising:
(a) a valve body threaded into a wall of a supply tank, said valve body
(i) being internally threaded adjacent the supply tank to receive an externally threaded insert which holds a disc-like porous gasket within the base, said externally threaded insert having a longitudinal gap in its threads to form an open path from the supply tank to the porous gasket,
(ii) having an external annular flange which bears in sealing engagement upon an annular sealing element disposed between the flange and the wall of the supply tank, and
(iii) having an internal annular flange, a portion of which bears upon the outer edge of the porous gasket,
(b) a cylindrical mixing chamber body mounted upon the valve body and containing an inwardly extending flange portion forming an orifice within and concentric with said mixing chamber body;
(c) a tapered needle partially projecting into the orifice and held between
(i) a further portion of the internal annular flange, said needle projecting partially beyond said internal annular flange with its narrowest portion remote from that flange, and
(ii) a spring disposed between it and the porous gasket;
(d) screw threads disposed on the mixing chamber body to engage with corresponding screw threads disposed on the valve body, the mixing chamber body thereby moving axially relative to the valve body, thus altering the extent of penetration of the needle into the orifice;
(e) a plurality of apertures regularly spaced about the mixing chamber body through which air is admitted to mix with vaporized fuel passing through the orifice;
(f) an annular insert placed within the mixing chamber body so that vaporized fuel issuing from the orifice and air entering the chamber through the apertures together flow through an axial bore in the annular insert;
(g) a burner head containing within it an annular element forming a channel through which the mixture of vaporized fuel and air flows after leaving the axial bore in the annular insert, said burner head having regularly spaced apertures through which the vaporized fuel and air mixture then flows and is consumed; and
(h) an annular heat dissipater mounted about the burner head adjacent to the apertures contained therein, said heat dissipater being provided with concentric grooves on its face to promote uniform heat dissipation.

7. A gas burning apparatus according to claim 6 wherein the screw threads are disposed about the cylindrical mixing chamber and the corresponding screw threads with which they engage are disposed within the valve body.

8. A gas burning apparatus according to claim 7 wherein the burner head is of ceramic material and all other elements are of brass.

9. A gas burning apparatus comprising:
(a) a valve body adapted to be connected to a wall of a supply tank, said valve body
(i) being internally threaded adjacent the supply tank to receive an externally threaded inset which holds a disc-like porous gasket within the valve body, said inset having a longitudinal gap in its threads to form an open path from the supply tank to the porous gasket,
(ii) having an external annular flange adapted to bear in sealing engagement upon an annular sealing element disposed between the external annular flange and the wall of the supply tank, and
(iii) having an internal annular flange, a portion of which bears upon the outer edge of the porous gasket,
(b) a cylindrical mixing chamber body mounted upon the valve body and containing an inwardly extending flange portion forming an orifice which is within and concentric with said mixing chamber body;
(c) a tapered needle partially projecting into the orifice and held between
(i) a further portion of the internal annular flange, said needle projecting partially beyond said internal annular flange with its narrowest portion remote from that flange, and
(ii) a spring disposed between it and the porous gasket;
(d) screw threads disposed on the mixing chamber body to engage with corresponding screw threads disposed on the valve body, the mixing chamber body thereby moving axially relative to the valve body when the chamber is rotated relative to the valve body, thus altering the extent of penetration of the needle into the orifice;

(e) at least one aperture disposed in the mixing chamber body through which air is admitted to mix with vaporized fuel passing through the orifice; and (f) a burner mounted adjacent the mixing chamber body to receive and burn the mixture of vaporized fuel and air.

10. A gas burning apparatus comprising:
(a) a valve body adapted to be connected at one end to a wall of a supply tank, said valve body having:
  (i) a porous gasket disposed therein in communication with the one end of said valve body,
  (ii) an internal annular flange, an outer portion of which bears upon the outer edge of the porous gasket on the side opposite said one end and an inner portion which includes an opening extending therethrough concentrically of said valve body, said opening being in communication with said porous gasket,
(b) a cylindrical mixing chamber body mounted upon the valve body and containing an inwardly extending flange portion forming an orifice which is within and concentric with said mixing chamber body;
(c) a tapered needle partially projecting into the orifice and held in said valve body between
  (i) the inner portion of the internal annular flange, said needle projecting partially through the opening therein beyond said internal annular flange with its narrowest portion remote from that flange, and
  (ii) a spring disposed between it and the porous gasket;
(d) means for moving the mixing chamber body axially relative to the valve body to alter the extent of projection of the needle into the orifice;
(e) at least one aperture disposed in the mixing chamber body through which air is admitted to mix with vaporized fuel passing through the orifice; and
(f) a burner mounted adjacent the mixing chamber body to receive and burn the mixture of vaporized fuel and air.

References Cited
FOREIGN PATENTS
17,394    6/1913    France.
                  (1st addition to No. 456,009).
12,993    8/1896    Switzerland.

EVERETT W. KIRBY, *Primary Examiner.*